July 13, 1965  J. J. ASTLEFORD, JR., ETAL  3,195,015
PROTECTED ELECTRICAL APPARATUS
Original Filed May 12, 1959  4 Sheets-Sheet 1

INVENTORS
John J. Astleford,Jr.,Thomas P. Henry
and Merrill G. Leonard.
BY Clement L. McHale
ATTORNEY

July 13, 1965 J. J. ASTLEFORD, JR., ETAL 3,195,015
PROTECTED ELECTRICAL APPARATUS
Original Filed May 12, 1959 4 Sheets-Sheet 4

United States Patent Office 3,195,015
Patented July 13, 1965

3,195,015
PROTECTED ELECTRICAL APPARATUS
John J. Astleford, Jr., Sharon, Pa., and Thomas P. Henry, Masury, and Merrill G. Leonard, Fowler, Ohio, assignors to Westinghouse Electric Corporation, East Pittsburgh, Pa., a corporation of Pennsylvania
Continuation of applications Ser. No. 812,632, May 12, 1959, now Patent No. 3,126,500, dated Mar. 24, 1964, and Ser. No. 812,633, May 12, 1959. This application Sept. 22, 1960, Ser. No. 57,772
9 Claims. (Cl. 317—14)

This invention relates generally to protected electrical apparatus, and more particularly, to protected apparatus for transformers.

This application is a continuation of our copending applications Serial No. 812,632, now Patent No. 3,126,500, and Serial No. 812,633, now abandoned, which were both filed May 12, 1959 and which are both assigned to the same assignee as this application.

In conventional electrical power systems in which distribution transformers of the self-protected type are commonly connected between a high voltage supply or feeder circuit and a low voltage distribution or load circuit, circuit breakers are provided within the transformers for disconnecting the transformer from the distribution circuit upon the occurrence of predetermined load conditions in the transformer. In transformers which operate in a cooling and insulating fluid or liquid dielectric, such as oil, a thermally responsive or temperature responsive means or element or a number of such elements may be employed for actuating the associated circuit breaker to protect the transformer from the damage which results from overheating caused by overloading the transformer. Thermally responsive means, such as bimetallic elements or devices, may be used for the latter purpose and may be so located or disposed that they are immersed in the insulating liquid or fluid and heated both in accordance with the temperature of the insulating fluid and in accordance with the current flowing in the transformer secondary circuit. The insulating fluid temperature or thermal condition is a function of the heating of the transformer core and coils over a prolonged or considerable period of time and current flowing at any particular time has a more direct effect on the heating of the transformer which is taking place at the latter time rather than over a prolonged period of time. By properly coordinating the relative effects of the long time loads as indicated by the fluid or liquid temperature and the short time loads as indicated by the instantaneous current flowing in the secondary winding of a transformer, the thermally responsive or temperature responsive means or elements can be made responsive to the copper temperature or winding temperature of said transformer in a well-known manner.

In a conventional, self-protected distribution transformer of the type described, the operation of the circuit interrupter is actuated through suitable mechanical means upon the operation of an associated thermally responsive means, such as a bimetallic element. In other words, upon the occurrence of a predetermined load or operating condition in the transformer, the operation or deformation of a conventional thermally responsive means, such as a bimetallic element, is mechanically amplified by suitable tripping means to actuate an associated circuit interrupter and interrupt the secondary circuit of said transformer. Examples of conventional protective devices of the type described are disclosed in U.S. Patent 2,223,530 and in U.S. Patent 2,586,429 filed by J. K. Hodnette et al. and assigned to the same assignee as the present application. As the desired ratings of conventional electrical apparatus, such as distribution transformers, of the self-protected type, increase, the load currents which must be interrupted by the associated circuit interrupter and the mechanical forces involved also increase to a corresponding degree. Because of the large mechanical forces involved in interrupting load currents associated with distribution transformers having higher ratings, it has been found that certain mechanical problems arise in providing suitable mechanical means or tripping means for actuating a circuit interrupter to a circuit interrupting position in response to or upon the operation of a conventional thermally responsive means. It is therefore desirable to provide a distribution transformer of the self-protected type in which the latter mechanical problems are substantially eliminated and in which several other advantages are obtained.

It is an object of this invention to provide a new and improved electrical transformer including means for indicating and protecting said transformer against predetermined load conditions in the transformer.

Another object of this invention is to provide a new and improved electrical transformer in which an associated circuit interrupter is actuated by electrically operated means in response to the operation of an associated thermally responsive means.

A more specific object of the invention is to provide a new and improved electrical transformer, including signalling means for indicating a predetermined load condition in said transformer, a circuit interrupter having electrically operated tripping and reclosing means, and manually operable means for controlling the operation of said tripping and reclosing means.

Other objects of the invention will, in part, be obvious and will, in part, appear hereinafter.

For a fuller understanding of the nature and objects of the invention reference should be had to the detailed description taken in connection with the accompanying drawings, in which.

Figures 1, 3, 4:
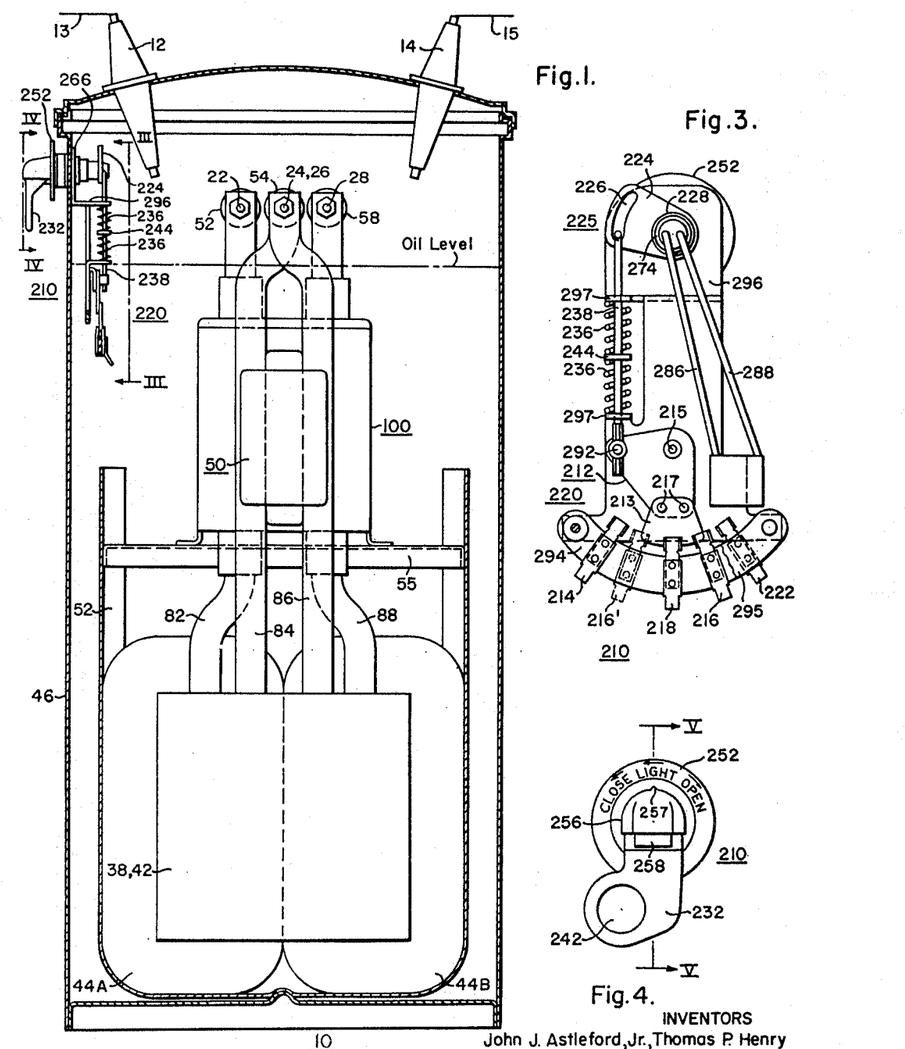
FIGURE 1 is a simplified view, partly in section and partly in side elevation, of a transformer showing protective apparatus applied thereto in accordance with the teachings of this invention.
FIG. 3 is a side elevational view of the manually operable means for operating the circuit interrupter associated with the transformer shown in FIG. 1, taken along the line III—III in FIG. 1, in the neutral position.
FIG. 4 is a side elevational view of the exterior portion of the manually operable means shown in FIG. 3 taken along the line IV—IV in FIG. 1.
Figure 2:
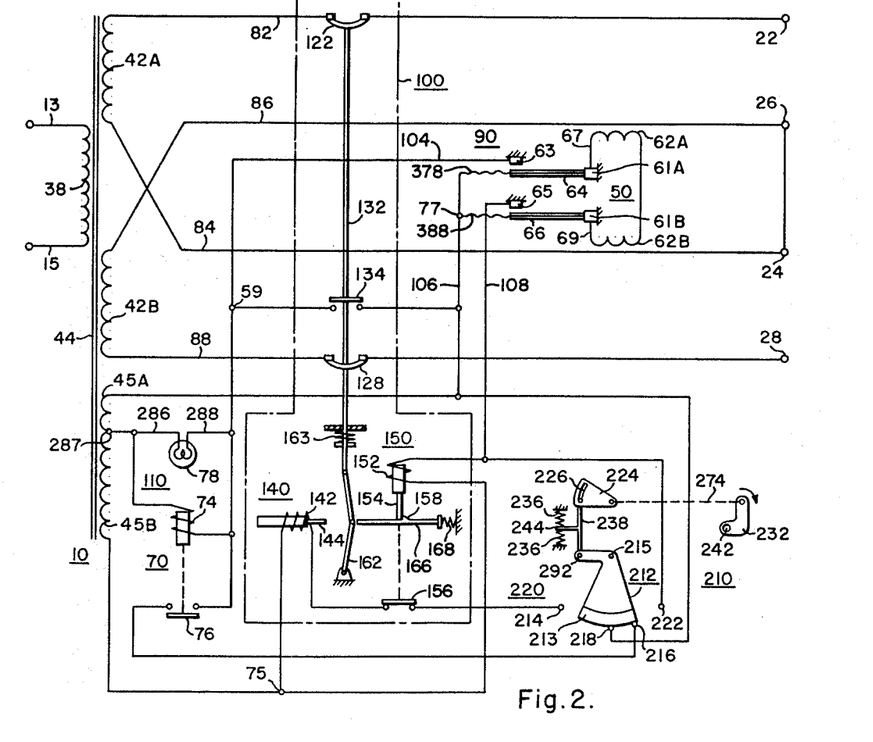
FIG. 2 is a diagrammatic view of circuits and apparatus comprising the transformer shown in FIG. 1.

Referring now to the drawings and FIGS. 1 and 2 in particular, there is illustrated a transformer 10 having a tank or casing 46 enclosing a high voltage or primary winding 38 and a low voltage or secondary winding 42, including first and second low voltage winding portions 42A and 42B, said windings being inductively disposed on a magnetic core structure 44 including first and second magnetic core members 44A and 44B. The windings 38 and 42 together with the magnetic core members 44A and 44B comprise a core and coil assembly which is maintained in assembled relationship by a generally U-shaped, wrap-around end frame structure 52, the ends of which are connected by a horizontal member 55, as best shown in FIG. 1. A sufficient quantity of dielectric fluid, such as oil, is employed to at least partially fill the casing 46 and preferably to substantially immerse the windings 38 and 42 and the magnetic core structure 44.

The primary winding 38 of the transformer 10 is connected through the bushings 12 and 14 which pass through the casing 46 to a source of electrical energy represented by the supply conductors 13 and 15. The secondary winding portions 42A and 42B are connected to the distribution circuit conductors 22 and 24 and 26 and 28, respectively, by the secondary leads 82 and 84 and 86 and 88, respectively. As shown in FIG. 1 the distribution circuit conductors or terminals 22 and 28 are connected to the associated secondary leads through the secondary bushings or terminal connectors 52 and 58, respectively, which pass through the casing 46. The distribution circuit conductors or terminals 24 and 26 may be connected to the associated secondary leads 84 and 86, respectively, at a common terminal, as indicated at the terminal connector or low voltage bushing 54, shown in FIG. 1. In other words, one end of each of the secondary winding portions 42A and 42B may be connected by the secondary leads 84 and 86 and the associated distribution circuit conductors 24 and 26 to a common junction point or terminal 54, as shown in FIG. 1. The terminal connector 54 may be a neutral or ground terminal. It is to be understood that in different applictions that the secondary winding portions 42A and 42B may be connected either in parallel circuit relationship or series circuit relationship with respect to each other.

In general, a circuit interrupter, more specifically a reclosable circuit breaker, indicated at 100, is provided within the casing 46 of the transformer 10 having circuit interrupting contact members 122 and 128 that are connected in series circuit relationship with the secondary leads 82 and 88, respectively, and mechanically connected to operate together, as illustrated. The thermally responsive means 50 is provided for effecting the actuation or operation of the circuit breaker 100 under certain predetermined operating conditions of the transformer 10. In addition, a signalling means or circuit 110 including an indicating lamp 78, which is visible exteriorly of the casing 46, is generally disposed within said casing. The thermally responsive means 50 also effects the actuation or energization of the signalling means 110 under certain predetermined operating conditions of the transformer 10. A manually operable means 210, including an operating handle, which is available or accessible exteriorly of the casing 46, for actuating the circuit breaker 100 to circuit opening or circuit closing positions and for resetting the signalling means 110 after operation of said signalling means is also provided for the transformer 10.

In order to supply the electric current or power required for the operation of the circuit breaker 100 and the signalling means 110, a coil or winding 45 including first and second coil portions 45A and 45B is inductively disposed on the magnetic core structure 44 of the transformer 10 and loosely coupled electromagnetically with the windings 38 and 42 of said transformer. As disclosed in greater detail in U.S. Patent 2,298,126, filed by J. K. Hodnette and assigned to the same assignee as the present application for a similar coil employed in a signalling system for transformers, the coil portions 45A and 45B provide substantially a predetermined voltage to the associated circuit breaker 100 and the signalling means 110 independently of the position of the contact members 122 and 128 of said circuit breaker whenever a suitable supply voltage is applied to the primary winding 38 of the transformer 10 and without subjecting the components of said circuit breaker and signalling means to damage due to overvoltages which may result when surge voltages are present on the windings 38 and 42 of said transformer during certain abnormal operating conditions.

The circuit breaker 100 may be of any suitable type of circuit breaker which may be actuated to a circuit interrupting position when energized by the operation of the thermally responsive means 50 or the manually operable means 210 and which may be actuated to a circuit closing position when electrically energized by the operation of the manually operable means 210. In particular, the circuit breaker 100 is preferably of the general type which is disclosed in our copending application Serial No. 801,843, filed March 25, 1959 which issued August 1, 1961 as U.S. Patent No. 2,994,753 and is assigned to the same assignee as the present application.

Referring to FIG. 2, the circuit breaker 100 is shown diagrammatically with the contact members of said circuit breaker in the circuit closing position. The contact members 122 and 128 of the circuit breaker 100 are disposed or mounted on a movable contact arm 132 which is mechanically coupled or linked to the toggle mechanism 162, the toggle mechanism 162 being shown in the position corresponding to the circuit closing position of the contact members 122 and 128. The movable contact arm or switch operating member 132 is biased in the downward direction by the spring 163 for reasons which will be explained hereinafter. An auxiliary contact member 134, which is normally opened when the associated contact members 122 and 128 are in the closed position, is also mounted or disposed on the movable contact arm 132.

The circuit breaker 100 also includes an electrically operated tripping means, more specifically the tripping solenoid 150, which may be energized from the loosely coupled coil 45, either upon the operation of the thermally responsive means 50 or upon the operation of the manually operable means 210. The tripping solenoid 150 comprises an operating coil 152 and a plunger or tripping member 154 which engages a projection or catch 158 on the latch rod 166 when said operating coil is deenergized to thereby prevent the trip biasing spring 168 from moving the latch rod 166 to the left and actuating the toggle mechanism 162 and movable contact arm 132, as well as the contact member 122 and 128 of the circuit breaker 100, to the circuit interrupting position. The tripping solenoid 150 also includes a contact member 156 which is normally closed when the operating coil 152 of said solenoid is deenergized, for reasons which will be explained hereinafter. The upper end of the operating coil 152 of the solenoid 150 is electrically connected to the stationary contact 65 of the thermally responsive means 50 and also to the terminal 222 of the manually operable means 210 in order that said solenoid may be energized upon the operation of said thermally responsive means or upon the operation of said manually operable means. The lower end of the operating coil 152 of the tripping solenoid 150 is connected to the terminal 75 which is connected in turn to the lower end of the loosely coupled coil 45.

The circuit breaker 100 also preferably includes an electrically operated reclosing means, more specifically the reclosing solenoid 140, which in general is arranged to be energized by the operation of the manually operable means 210 to actuate the contact members 122 and 128 of said circuit breaker to circuit closing positions. The reclosing solenoid 140 comprises an operating coil 142 and a plunger 144 which is moved to the right when said operating coil is energized. The operating coil 142 of the reclosing solenoid 140 is connected in series circuit relationship with the normally closed contact 156 of the tripping solenoid 150, the series circuit being connected between the terminal 214 of the manually operable means 210 and the terminal 75 which is connected in turn to the lower end of the loosely coupled coil 45.

During the operation of the circuit breaker 100, when the tripping solenoid 150 is energized by either the thermally responsive means 50 or the manually operable means 210, the tripping member 154 of the solenoid 150 is moved in an upward direction by the operating coil 152 to disengage the projection or catch 158 on the latch rod 166. When the trip member 154 disengages the catch 158, the trip bias spring 168 moves the latch rod 166 to the left causing the toggle mechanism 162 to also move to the left and permitting the biasing spring 163 to cooperate with the trip bias spring 168 to actuate said toggle mechanism and the movable contact arm 132, as well as the contact members 122 and 128, to circuit interrupting positions. Energizing the operating coil 152 of the tripping solenoid 150 also opens the normally closed contact 156 of said solenoid which is connected in series circuit relation with the operating coil 142 of the reclosing solenoid 140 to thereby prevent energization of the reclosing solenoid 140 so long as the operating coil 152 of the tripping solenoid 150 is energized.

On the other hand, after the circuit breaker 100 has been actuated to a circuit interrupting position by the energization of the tripping solenoid 150, the circuit breaker 100 can be restored to a circuit closing position by the operation of the manually operable means 210 to energize the reclosing solenoid 140, assuming that the operating coil 152 of the tripping solenoid 150 is now deenergized. Energizing the operating coil 142 of the reclosing solenoid 140 causes the plunger member 144 to move to the right to reset the toggle mechanism 162 and to actuate the movable contact arm 132, as well as the contact members 122 and 128, to circuit closing positions. The resetting of the toggle mechanism 162 by the reclosing solenoid 140 in turn resets the latch rod 166 whose projection or catch 158 is again engaged by the tripping member 154 of the tripping solenoid 150 assuming, as just mentioned, that the operating coil 152 of said tripping solenoid is now deenergized. It is to be noted that the circuit breaker 100, as well as the contact members 122 and 128 of said circuit breaker, are preferably arranged to be immersed in the insulating or cooling fluid, as best shown in FIG. 1, in order to improve arc interruption when said circuit breaker is actuated to a circuit interrupting position.

Referring to FIGS. 1 and 2 and as described in our copending application Serial No. 812,632 filed May 12, 1959, and assigned to the same assignee as the present application, the thermally responsive means 50 comprises first and second thermally responsive elements, more specifically the bimetallic strip members 64 and 66, respectively, and current responsive means, more specifically the first and second current transformers or pick-up coils 62A and 62B, respectively, which are non-ferromagnetically coupled to or disposed in inductive relationship with the secondary leads 86 and 84, respectively, from the secondary winding portions 42B and 42A, respectively. It is to be understood that, in certain applications, the pick-up coils 62A and 62B may be combined in a single pick-up coil 62 having first and second winding portions 62A and 62B disposed adjacent to the leads 86 and 84, respectively, and effectively connected in series circuit relationship.

Figure 10:
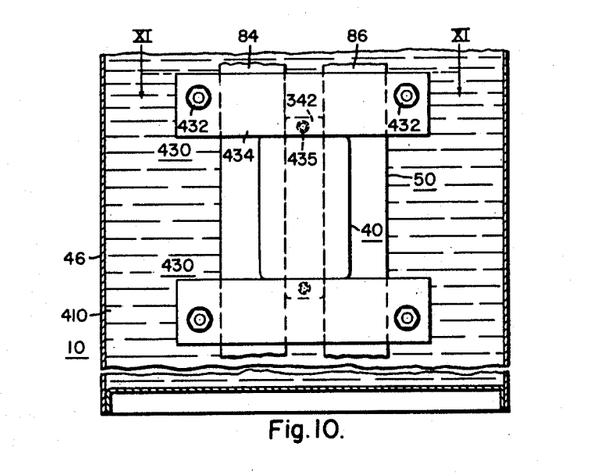
FIG. 10 is a partial elevational view illustrating the mounting arrangement of a thermally responsive device, as shown in FIG. 1, on the leads of the associated electrical apparatus.

The current transformers or pick-up coils 62A and 62B are connected in series circuit relationship to produce an output current at the conductors 67 and 69 which varies with the sum of the load currents flowing in the secondary leads 86 and 84, respectively. The first and second bimetallic members 64 and 66 are also connected in series circuit relationship, the series circuit comprising a burden or load across the output conductors 67 and 69 of the current transformers or pick-up coils 62A and 62B. The current which flows through the first and second bimetallic members 64 and 66 and the corresponding heating of said bimetallic members due to said current, therefore, varies with the load current flowing in the secondary leads 86 and 84, and the secondary winding portions 42A and 42B, respectively, the sum of said currents being effective to heat said bimetallic members. As best shown in FIGS. 1 and 10, the thermally responsive means 50 is substantially immersed in the insulating or cooling fluid inside the casing 46 of the transformer 10 and the temperature or thermal condition of the bimetallic members 64 and 66 also varies with the temperature or thermal condition of said fluid. The total temperature or thermal condition of the bimetallic members 64 and 66, therefore, varies with both the load current flowing in the secondary winding portions 42A and 42B, as sensed by the current transformers or pick-up coils 62A and 62B in the secondary leads 86 and 84, respectively, and with the temperature or thermal condition of the insulating or cooling fluid inside the casing 46. As explained previously, for slowly changing load conditions of the transformer 10 during normal operating conditions and for moderate overload conditions up to approximately two to three times rated load current, the temperature or thermal condition of the insulating or cooling fluid inside the casing 46 closely follows the copper or winding temperature of the windings of the transformer 10 and controls the temperature or thermal conditions of the bimetallic members 64 and 66 to a much greater degree than the current flow through said bimetallic members. For much higher overload currents flowing in the secondary leads 86 and 84 of a short time nature, the temperature or thermal condition of the bimetallic members 64 and 66 is controlled to a much greater degree by the current flow in said bimetallic members, rather than by the temperature or thermal condition of the insulating or cooling fluid in the casing 46 in order that the thermally responsive means 50 more closely follow the copper or winding temperature or thermal condition of the transformer 10 during the latter abnormal operating condition.

In general, the first bimetallic member 64 of the thermally responsive means 50 is connected in circuit relation with the signalling means 110 to actuate the operation of said signalling means upon the occurrence of a first predetermined operating or thermal condition of the transformer 10. The second bimetallic member 66 of the thermally responsive means 50 is connected in circuit relation with the circuit breaker 100 in order to actuate said circuit breaker to a circuit interrupting position upon the occurrence of a second predetermined operating or load condition of the transformer 10. The first bimetallic member 64 is preferably arranged to be responsive to a lower temperature or thermal condition than the second bimetallic member 66, for reasons which will be explained hereinafter.

In particular, the right-hand or fixed ends of the bimetallic members 64 and 66 are mounted on suitable abutments 61A and 61B, respectively, in the thermally responsive device 50 and electrically connected to the output conductors 67 and 69, respectively, of the current transformers or pick-up coils 62A and 62B, respectively. The left-hand, free or movable ends of the bimetallic members 64 and 66 are both connected to a common junction point or terminal, as indicated at 77, which is connected in turn to the upper end of the loosely coupled coil 45 through the conductor 106. As the temperature or thermal condition of the bimetallic members 64 and 66 increases, said bimetallic members deflect or deform and the free end of each of said bimetallic members moves in an upward direction to form first and second switching means with the associated stationary contact members 63 and 65, respectively, which are actuated by said bimetallic members. The stationary contact member 63 is connected to the terminal 59 which is connected in turn to the conductor 288 in the signalling means 110. The stationary contact member 65 is connected to the upper end of the operating coil 152 of the tripping solenoid 150 in the circuit breaker 100 and to the terminal 222 in the manually operable means 210, as previously mentioned.

Figure 7:
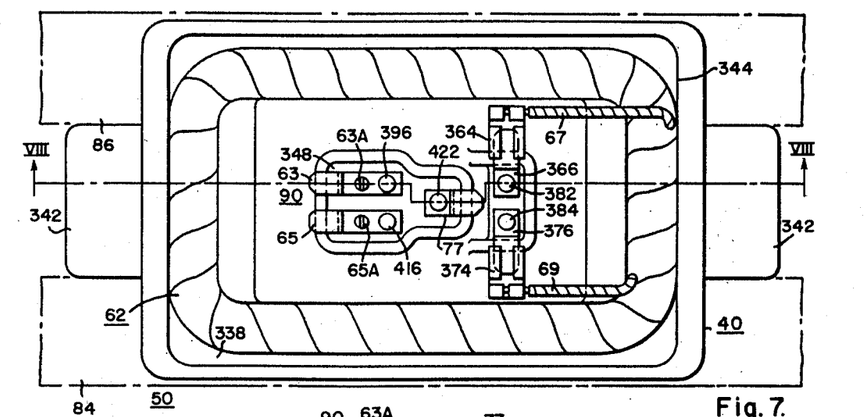
FIG. 7 is a partial top plan view of a thermally responsive device embodying the principles of the invention with the leads of the associated electrical apparatus shown in phantom.
Figure 8:
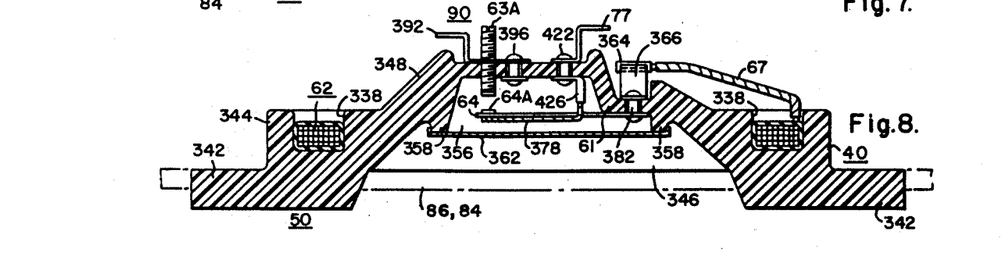
FIG. 8 is a sectional view taken along the line VIII—VIII of FIG. 7 and looking in the direction of the arrows.
Figure 9:
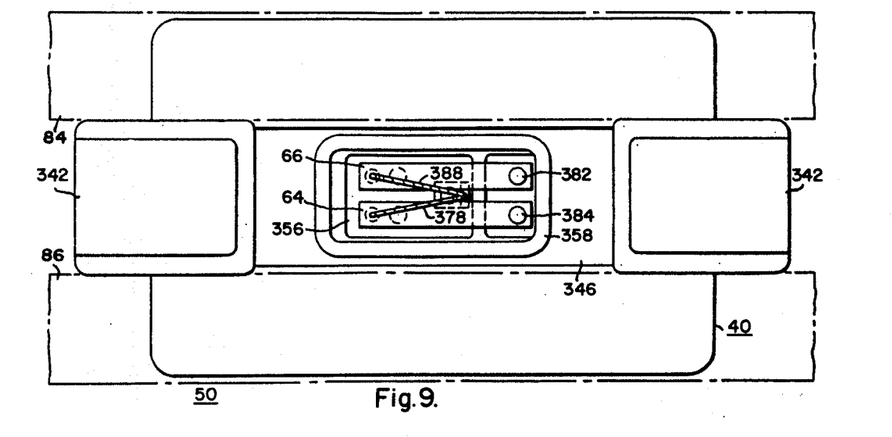
FIG. 9 is a bottom view of the device shown in FIG. 7, with a partition member removed.

As disclosed in our copending application Serial No. 812,632 previously mentioned and as best shown in FIGS. 7 through 9, the thermally responsive device 50 comprises a base member 40, which is preferably molded from a suitable molding material, such as a glass polyester type of molding material. The base member 40 includes a main portion 344, which is generally rectangular in shape, a terminal plate portion 348, which projects generally upwardly from said main portion, a generally cup-shaped cavity or recess 346, a slot or recess 338 which extends around and is adjacent to the periphery of said main portion, and mounting feet or extensions 342 at the opposite ends of said base member. In order to form a closed chamber or housing in the upper portion of the cavity 346, for reasons which will be discused hereinafter, a partition or divider member 362 is disposed inside said cavity and sealed to the shoulder portion 358 of the base member 40 in a substantially fluid-tight joint by a suitable sealing or bonding material, such as an epoxy resin. The partition or cover member 362 is preferably formed from a material having a high thermal conductivity, such as a metal.

The pick-up coil or current transformer winding 62 is disposed in the slot 338 of the main portion 44 of the base member 40, as best shown in FIGS. 7 and 8, and includes a plurality of turns of an insulated conductor which are disposed in inductive relationship with or non-ferromagnetically coupled to the adjacent secondary leads 86 and 84 of the transformer 10. The pick-up coil 62 includes first and second winding portions 62A and 62B, respectively, which are disposed adjacent to the secondary leads 86 and 84, respectively, and effectively connected in series circuit relationship so that the output current induced in said pick-up coil when current flows in one or both of the secondary leads 86 and 84 varies with the sum of the currents in said secondary leads and the associated windings of the transformer 10. As best shown in FIGS. 7 and 8, the plane of the coil 62 is substantially parallel to and close to the plane of the conductors 84 and 86 so that there is good mutual coupling therebetween, in contrast with the substantially negligible mutual coupling that would exist if the coil were at or near a right angle with respect to the conductors. The output current of the pick-up coil 62 which appears at the output condctors 67 and 69 is applied to the bimetallic elements 64 and 66 through suitable clip-on type terminal connectors 364 and 374, respectively, which are electrically connected to the terminal members 366 and 376, respectively, which in turn are electrically connected to the ends of the bimetallic elements 64 and 66, respectivley, by the rivets 382 and 384, respectively. It is important to note that due to the absence of a ferromagnetic core associated with the winding portions of the pick-up coil 62 that the output current of said pick-up coil varies in a substantially linear manner with the sum of the currents in the secondary leads 86 and 84 even during certain abnormal operating conditions of the transformer 10, such as during short circuit or fault conditions at the distribution circuit terimnals 22, 24, 26 and 28. It is to be understood that in certain applications, separate or individual pick-up coils or current transformer windings may be provided for each of the secondary leads 86 and 84, rather than a single pick-up coil as shown in FIGS. 1, 7 and 8.

The bimetallic elements 64 and 66 are preferably mounted or disposed inside the sealed chamber 356 of the base member 40 with one end of each of said bimetallic elements fixed or secured to the abutment or shoulder 61 of said base member by suitable fastening means, such as the rivets 382 and 384, respectively. The other or free ends of each of the bimetallic elements 64 and 66 are electrically connected to the common junction point or terminal 77 by the flexible conductors 378 and 388, respectively, through a connecting terminal 426 and a rivet 422 which also functions as a suitable fastening means for securing the terminals 368 and 426 to opposite sides of the terminal plate portion 348 of the base member 40, as best shown in FIG. 8. The common junction point or terminal 77 is also connected to associate signaling or protective equipment by the conductor 106, as shown in FIG. 1. The bimetallic elements 64 and 66 are arranged to deflect or deform as the temperature or thermal condition of the transformer 10 changes with the free ends of the bimetallic elements 64 and 66 arranged to move in an upward direction to actuate the associated contact means 90 upon the occurrence of predetermined thermal load or operating conditions in the transformer 10. The temperature or thermal condition of the bimetallic elements 64 and 66 varies primarily with the temperature of the insulating fluid 110 of the transformer 10 for slowly changing load conditions of said transformer and primarily with the current flow in the secondary leads 86 and 84 and the associated windings of said transformer for rapidly changing load conditions of the said transformer, particularly when large overload currents are flowing in the windings of said transformer. The bimetallic elements 64 and 66 may be arranged to actuate associated contact means upon the occurrence of substantially the same temperature or thermal condition of the transformer 10 or upon the occurrence of different predetermined thermal conditions or temperatures of said transformer. For example, the bimetallic element 64 may be arranged to actuate the contact means 90 and an associated signaling means, such as the indicating lamp 78, upon the occurrence of a first predetermined thermal conditions of the transformer 10 and the bimetallic element 66 may be arranged to actuate the contact means 90 and an associated protective means, such as the circuit breaker 100, upon the occurrence of a second predetermined thermal condition of the transformer 10, which is preferably higher than the first predetermined thermal condtion.

In order to reduce the size of the bimetallic elements 64 and 66 required in the thermally responsive device 50, the space in the sealed chamber 356 of the base member 40 is preferably at least partially filled with a suitable material, such as air, having a lower thermal conductivity than the insulating fluid 410 of the transformer 10. The latter arrangement reduces the heat transfer or loss from the bimetallic elements 64 and 66 during certain operating conditions such as when the load on the transformer 10 is changing rapidly and the heating of said bimetallic elements is being controlled primarily by the currnet flow in the secondary leads 86 and 84 and the corresponding output current of the pick-up coil 62. As mentioned previously, the latter condition occurs primarily when the secondary leads 86 and 84 are carrying high overload currents. In general, the latter arrangement also reduces the required current through said bimetallic elements to obtain a predetermined heating of said elements and increases the overall thermal efficiency of the device 50.

The contact means 90 comprises the movable contact members 64A and 66A, which are mounted or disposed on the free ends of the bimetallic elements 64 and 66, respectively, or formed integrally with said bimetallic elements, and the associated stationary contact members 63 and 65, respectively, which are mounted on the terminal plate portions 348 of the base member 40 and secured thereto by suitable fastening means, such as the rivets 396 and 416, respectively. The stationary contact members 63 and 65 include the adjustable contact posts or set screw contact members 63A and 65A, respectively. The adjustable contact posts 63A and 65A threadably engage the lower portion of the stationary contact members 63 and 65, respectively, and pass through the terminal plate portion 348 of the base member 40 into the chamber 356, the lower ends of the adjustable contact posts 63A and 65A being arranged to be engaged by the associated movable contact members 64A and 66A, respectively, upon the occurrence of predetermined load or operating conditions in the transformer 10. The distance or separation between the adjustable contact posts 63A and 65A and the associated movable contact members 64A and 66A, respectively, may be varied by the setting of said adjustable contact posts in order to vary the deflection required by the associated bimetallic members 64, 66, respectively, as well as the corresponding thermal conditions of the transformer 10, to cause said contact members to be engaged or actuated to a circuit closing position for calibration purposes or to adjust the thermally responsive device for use with different ratings of associated electrical apparatus. The stationary contact members 63 and 65 are connected in circuit relation with associated signaling or protective equipment as shown in FIG. 2 by the conductors 104 and 108, respectively, so that when the bimetallic elements 64 or 66 actuate the movable contact members 64A and 66A, respectively, of the contact means 90 to circuit closing positions, closed circuits are formed between the common conductor 106 and either the conductor 104 or the conductor 108, respectively. The forming of the closed circuits just described by the thermally responsive device 50 in response to predetermined operating conditions of the transformer 10 may conveniently serve to energize or actuate electrically operated signaling or protective equipment, as previously mentioned, by connecting said equipment to a suitable source of electrical current.

Figure 11:
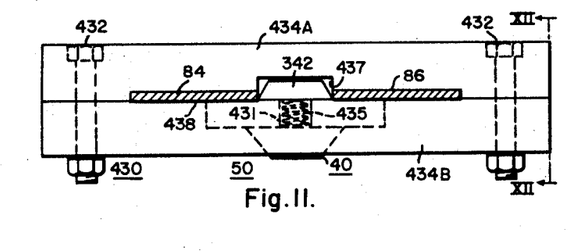
FIG. 11 is a partial top plan view taken along the line XI—XI of FIG. 10 and looking in the direction of the arrows; and, FIG. 12 is a partial elevational view, taken along the line XII—XII in FIG. 11, and looking in the direction of the arrows.
Figure 12:
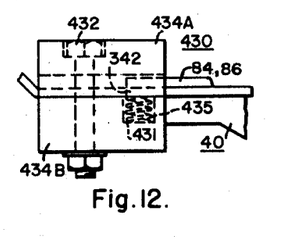

The spacing between the pick-up coil 62 in the thermally responsive device 50 and the leads of the associated electrical apparatus, such as a distribution transformer, has been found to be critical in order to obtain the best operating characteristics of said device and in order that the thermal characteristics of said device correspond more closely to the thermal condition or copper temperature of the associated electrical apparatus. Referring now to FIGS. 10 through 12, there is illustrated means for mounting the thermally responsive device 50 on the leads 86 and 84 of the transformer 10 and for maintaining substantially a predetermined spacing between the pick-up coil 62 of said device and said leads and, therefore, for maintaining substantially a uniform electromagnetic coupling between said leads and said device during substantially all operating conditions of the transformer 10.

In particular, the clamping or mounting means 430 is provided at each end of the thermally responsive device 50, as best shown in FIG. 10. As best shown in FIGS. 11 and 12, the clamping means 430 comprises a pair of cooperating block or strap members 434A and 434B for clamping one end of the thermally responsive device 50 to the leads 86 and 84 of the transformer 10. As shown in FIG. 11, the block or strap member 434A includes a first larger recess 438 which accommodates the leads 86 and 84 and a portion of one of the feet 342 and a second smaller recess 437 which accommodates a portion of one of the feet 342 of the thermally responsive device 50 which is disposed between the leads 86 and 84 and between the block or strap members 434A and 434B. The extremities or outer ends of the strap or block members 434A and 434B are preferably held together or secured by suitable means, such as the bolts 432 shown in FIG. 11.

It is to be noted that the block or strap members 434A and 434B assist in preventing lateral movement of the leads 86 and 84 with respect to each other, such as might otherwise occur during certain abnormal operating conditions when heavy overload currents are flowing through said leads which would then tend to move away from each other laterally and change the spacing between said leads and the pick-up coil 62 of the thermally responsive device 50. In addition, a compression or biasing spring 435 is disposed in a recess 431 of the strap or block member 434B to bear against one of the feet 342 of the thermally responsive device 50 to thereby cause the main portion 44 of the base member 40 of said device to bear against the leads 86 and 84 of the transformer 10 even during abnormal operating conditions of said transformer, such as when heavy overload currents are flowing in the leads 86 and 84, when said leads might otherwise tend to deform and cause a separation or change in the spacing between said leads and the pick-up coil 62 of the thermally responsive device 50 intermediate the clamping means 430 which are disposed at the ends of said thermally responsive device.

In summary, the mounting arrangement just described tends to maintain substantially a predetermined desired spaced relationship between the pick-up coil 62 of the thermally responsive device 50 and the adjacent leads 86 and 84 of the transformer 10. As mentioned previously, the latter arrangement is important to maintain substantially a uniform electromagnetical coupling between the current in the leads 86 and 84 of the transformer 10 and the device 50 during substantially all operating conditions of said transformer.

In the operation of the thermally responsive means 50, as the temperature or thermal condition of the transformer 10 gradually increases, the free end of the bimetallic member 64 deflects in an upward direction until said free end forms a closed circuit with the stationary contact member 63 between the upper end of the loosely coupled coil 45 at the terminal 77 and the conductor 288 in the signalling means 110 through the terminal 59 for reasons which will be discussed hereinafter. As the temperature or thermal condition of the transformer 10 increases still further and reaches substantially a second predetermined operating or thermal condition, the free end of the bimetallic member 66 deflects in an upward direction until said free end forms a closed circuit with the stationary contact member 65 which extends from the upper end of the loosely coupled coil 45 at the terminal 77 through the operating coil 152 of the tripping solenoid 150 and to the lower end of the loosely coupled coil 45 at the terminal 75, thus energizing the operating coil 152 of the tripping solenoid 150. By connecting the operating coil 152 of the tripping solenoid 150 across the loosely coupled coil 45 and energizing said operating coil, the bimetallic member 66 of the thermally responsive means 50 actuates the contact members 122 and 128 of the circuit breaker 100 to circuit interrupting positions, as previously described for said circuit breaker, in response to a predetermined operating or thermal condition of the transformer 10, thus interrupting the connection between the secondary leads 82 and 88 and the associated distribution circuit terminals 22 and 28, respectively, and interrupting current flow in the secondary winding portions 42A and 42B of the transformer 10 to protect said transformer from damage which might result from further loading or overloading. It is important to note that the thermally responsive means 50 protects the transformer 10 by actuating the circuit breaker 100 to a circuit interrupting position in response to gradually increasing and prolonged operating or load conditions of a moderate degree and in response to excessive overload conditions of a short time nature, such as those resulting from a short circuit condition at the distribution circuit conductors or terminals 22, 24, 26 and 28. It is also important to note that the thermally responsive means 50 is responsive to the sum of the load currents flowing in the secondary leads 84 and 86 and in the associated secondary winding portions 42A and 42B of the transformer 10 and therefore to the total thermal condition of said transformer.

Referring again to FIG. 2, the signalling means 110 comprises an indicating lamp 78, which, in general is energized by the operation of the thermally responsive means 50 to indicate that a first predetermined operating or thermal condition of the transformer 10 has been reached and a latching or holding relay 70 which maintains the energization of said indicating lamp after the indicating lamp has been energized by the thermally responsive means 50.

In particular, one end of the indicating lamp 78 is connected by the conductor 286 to the lower end of the coil portion 45A of the loosely coupled coil 45 at the tap connection or terminal 287. The other end of the indicating lamp 78 is connected by the conductor 288 to the terminal 59 which is connected in turn to the stationary contact member 63 of the thermally responsive means 50 through the conductor 104. The latching or holding relay 70 comprises an operating coil 74 and a holding contact 76 which is normally open when said operating coil is deenergized. The operating coil 74 of the holding relay 70 is connected in parallel circuit relationship with the indicating lamp 78 between the conductor 286 and the conductor 288, which is connected to the terminal 59. The holding contact 76 of the holding relay 70 is connected in series circuit relationship with the parallel circuit which includes the operating coil 74 and the indicating lamp 78, the series circuit being connected between the terminal 287 and the terminal 216 of the manually operable means 210. When the manually operable means 210 is in the neutral position as shown in FIG. 2, the terminal 216 is connected in turn by the bridging contact member 213 to the terminal 218 which is connected in turn to the terminal 77 and to the upper end of the coil portion 45A of the loosely coupled coil 45 to permit energization of the indicating lamp 78 by the operation of the bimetallic member 64 of the thermally responsive means 50.

Figure 5:
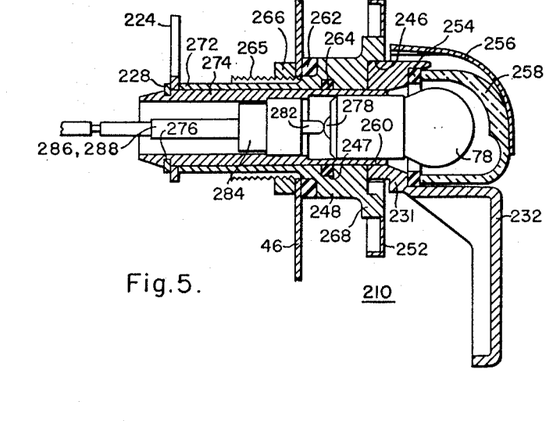
FIG. 5 is a sectional view of the manually operable means shown in FIGS. 3 and 4 taken along the line V—V in FIG. 4.

In the operation of the signalling means 110, assuming that the manually operable means 210 is in the neutral position shown in FIG. 2, as the temperature or thermal condition of the transformer 10 gradually increases to a predetermined operating or thermal condition, the bimetallic member 64 of the thermally responsive means 50 will move upward and form with the stationary contact member 63 a closed circuit which extends from the terminal 287 at the lower end of the coil portion 45A of the loosely coupled coil 45 through the conductor 286, the indicating lamp 78, the conductor 288, the terminal 59, the contact member 63, the bimetallic member 64, the terminal 77 to the upper end of the coil portion 45A thus connecting the coil portion 45A across the indicating lamp 78 and energizing said indicating lamp, which is visible exteriorly of the casing 46, as best shown in FIG. 5, to signal or indicate that said predetermined operating or thermal condition of the transformer 10 has been reached. The energization of the indicating lamp 78 by the thermally responsive means 50 also energizes the operating coil 74 of the holding relay 70 which is connected in parallel with said indicating lamp to thereby actuate the normally opened contact 76 of said holding relay to a closed position thus forming a holding circuit which extends from the terminal 287 at the lower end of the coil portion 45A, through the indicating lamp 78, the contact 76, the terminal 216 of the manually operable means 210, the bridging contact member 213 and the terminal 218 of said manually operable means to the terminal 77 and the upper end of the coil portion 45A of the loosely coupled coil 45. The latter operation, therefore, maintains the energization of the signalling lamp 78 after said lamp has been once energized by the operation of the bimetallic member 64 of the thermally responsive means 50 independently of the deflection of the bimetallic member 64 until the signalling means 110 is reset by the operation of the manually operable means 210, as will be discussed hereinafter. In other words, the indicating lamp 78 of the signalling means 110 remains energized after being energized by the operation of the bimetallic member 64 of the thermally responsive means 50, even though the bimetallic member 64 should subsequently change its deflection to a circuit interrupting position with respect to the contact member 63, as the transformer 10 cools and the temperature or thermal condition of said transformer decreases below said predetermined operating or thermal condition.

It is also important to note that the indicating lamp 78 of the signalling means 110 may also be energized by the operation of the auxiliary contact member 134 of the circuit breaker 100 whenever the contact members 122 and 128 of said circuit breaker are actuated to a circuit interrupting position by either the thermally responsive means 50 or the manually operable means 210. In particular, whenever the contact members 122 and 128 of the circuit breaker 100 are actuated to circuit interrupting positions, the auxiliary contact member 134 is actuated to a closed position thus forming a closed circuit which extends from the upper end of the coil portion 45A at the terminal 77, through the contact member 134 to the terminal 59 and the indicating lamp 78, through the conductor 288 and to the lower end of the coil portion 45A at the terminal 287 through the conductor 286, thus energizing the indicating lamp 78. The contact member 134, therefore, operates also to verify the reclosing operation of the circuit breaker 100 by the manually operable means 210 since the indicating lamp 78 of the signalling means 110 will remain energized by the contact member 134 so long as the contact members 122 and 128 of the circuit breaker 100 are in the circuit interrupting positions but will deenergize said indicating lamp when the contact members 122 and 128 of said circuit breaker are actuated to a closed position by the operation of the manually operable means 210. In addition, if the bimetallic member 64 of the thermally responsive means 50 should fail to energize the indicating lamp 78 upon the reaching of the first predetermined operating condition, then the contact member 134 will operate to energize said indicating lamp upon the reaching of the second predetermined operating condition when the circuit breaker 100 is actuated to a circuit interrupting position by the thermally responsive means 50.

Referring now to FIGS. 1 through 5, the manually operable means 210 is provided for actuating the circuit breaker 100 to circuit interrupting and circuit closing positions independently of the operation of the thermally responsive means 50 and for resetting the signalling means 110 after said signalling means has been once energized by the operation of said thermally responsive means. In other words, the manually operable means 210 is connected in circuit relation with the circuit breaker 100 for connecting the electrically operated tripping means 150 or the electrically operated reclosing means 140 to the loosely coupled coil 45 and in circuit relation with the signalling means 110 for deenergizing and resetting said signalling means after said signalling means has been once energized by the thermally responsive means 50.

More particularly, the manually operable means 210 comprises an operating handle which is available or accessible exteriorly of the casing 46 of the transformer 10 and which may be actuated to a plurality of positions and a switching means which is mechanically coupled to said operating handle and disposed internally of said casing for changing the connections of the loosely coupled coil 45 to the signalling means 110 and to the electrically operated tripping means and reclosing means 150 and 140, respectively, of the circuit breaker 100.

As best shown in FIGS. 1 and 5, the manually operable means or device 210 includes a foundation or base portion 248 having an outwardly flaring skirt 268, an inner recess 246 and a rearwardly extending sleeve portion 272. The stem or sleeve portion 272 is arranged to extend inwardly through an opening in the wall of the casing 46. As described in U.S. Patent 2,356,055 filed by J. K. Hodnette et al. and assigned to the same assignee as the present application for a similar switch employed to mechanically actuate an associated circuit interrupter, the sleeve portion 272 may be provided with a plurality of slots (not shown) into which associated fingers (not shown) in the walls of the casing 46 extend to position the sleeve or base portion of the overall structure so as to prevent said sleeve or base portion from rotating about its axis. The base or quadrant portion 248 is held tightly against the wall of the casing 46 by a nut 266 on the inner side thereof which pulls said base portion inwardly to apply pressure to a gasket 262 positioned between the casing 46 and a shoulder of the base portion 248. The nut 266 is arranged to engage a threaded portion 265 of the base or quadrant portion 248. The manually operable means or device 210 also includes a handle portion comprising the handle 232 and a body 231 integrally formed therewith and extending within the recess or cavity 246 of the base or quadrant portion 248. The handle 232 includes a recess or hole 242 to accommodate a hook stick which may be employed to rotate said handle and actuate the manual operable means 210 to a new position. A sleeve or internally hollow operating shaft 274 is attached or secured by suitable means, such as welding or soldering, at 269 to the body 231 and extends inwardly beyond the sleeve 272 of the base or quadrant portion 248. The handle 232 together with the integral body 231 and the sleeve or operating shaft 274 comprise a rotatable member which is concentrically arranged with respect to the stationary base or quadrant portion 248. A crank arm or lever member 224 is secured to the inner end of the sleeve 274 by any suitable means so that said lever member moves or rotates about the axis of said sleeve upon operation or rotation of the handle 232. For example, as disclosed in U.S. Patent 2,356,055 previously mentioned for a similar device, a plurality of slots (not shown) may be provided on the inner end of the sleeve 274 into which fingers (not shown) of the lever member 224 extend. A retaining ring 228 is disposed in a slotted portion 276 of the inner end of the sleeve 274 to retain the lever member 224 in position.

The indicating lamp 78 may be mounted in a socket formed by the sleeve or operating shaft 274 by means of projections (not shown) extending into slots in the sleeve 274 in a well-known manner and bringing the lamp contact members 278 into engagement with contact members 282 held within a block 284 of insulating material and connected to the circuit conductors 286 and 288. An O-ring type gasket or packing member 264 is provided in a slotted portion 247 of the base or quadrant portion 248 adjacent to the outside surface of the sleeve 274 to assist in preventing the entrance of moisture into the casing 46 of the transformer 10.

Referring to FIGS. 4 and 5, a covering or guard 256, having a substantially spherically outer portion, is attached by suitable fastening means, such as a screw (not shown) clamping action, or by a suitable bonding material, to the body 231 of the handle portion of the manually operable means 210. An opening is provided in the forward lower part of the cover or guard 256 for retaining a glass crystal or jewel 258 that is preferably colored red to provide a danger signal upon tthe overheating of the transformer 10, as indicated by the energization of the indicating lamp 78. A gasket member 254 is disposed between the inner end of the glass crystal or jewel 258 and the body 231 of the handle portion of the manually operable means 210 to assist in preventing the entrance of moisture into the casing 46 of the transformer 10. A position indicating or dial member 252 is attached or secured to the flared portion 268 of the base or quadrant portion 248 or may be formed integrally therewith. A projection 257 is provided on the guard member 256 which rotates with the handle 232 to indicate the position of the manually operable means 210, as marked on the position indicating member 252.

Referring to FIGS. 2 and 3, the lever member 224 is actuated in general by the rotation of the handle 232 externally of the casing 46 to manually operate the switching means 220 internally of said casing by means of a connecting rod 238 to one of a plurality of positions. In particular, a lost motion connection 225 is provided between the lever member or crank arm 224 and the connecting rod 238 by means of a slot or recess 226 in the crank arm 224 and the upper end of said connecting rod which is turned into said slot and held captive by suitable means such as a washer and cotter pin (not shown). The lost motion connection 225 is provided in order that the rotational travel of the crank arm or lever member 224 be similar to or substantially coincide with that of a conventional operating handle in a switch operator, such as disclosed in U.S. Patent 2,356,055 previously mentioned. The lower end of the connecting rod 238 is pivotally connected to the rotatable switch arm 212 of the switching means 220 by means of a pivot pin 292.

The switching means 220 comprises a rotatable switch arm 212 formed from a suitable insulating material, a movable bridging contact member 213 which is fixedly attached or fastened to said switch arm and a plurality of finger type stationary contact members 214, 216, 218 and 222. The rotatable switch arm 212 is pivotally mounted by means of a pivot pin 215 which is supported in turn by the bracket member 296, as best shown in FIGS. 1 and 3. The switch arm 212 is arranged to rotate about the pivot pin 215 when actuated by the vertical movement of the connecting rod 238. The movable bridging contact member 213 is rigidly connected to the switch arm 212 by suitable fastening means, such as the rivets 217, and arranged to rotate with said switch arm. The stationary contact members 214, 216, 218 and 222 are mounted or supported on an arcuately-shaped terminal supporting or bracket member 294 to which said stationary contact members are fastened by suitable means, such as rivets or screws, the upper end of each of said terminals being arranged to be engaged by the movable bridging contact member 213 as said movable contact member rotates with the switch arm 212. The terminal supporting member 294 is mounted on or supported in turn by the bracket member 296 to which said terminal supporting member is fastened by suitable means, such as rivets or bolts. As best shown in FIG. 1, the bracket member 296 is secured to the inner side of the casing 46 by suitable means, such as the nut 266 or by welding, and includes a recess through which passes the sleeve or internally hollow operating shaft 274 of the manually operable means 210. It should be noted that the holding relay 70 of the signalling means 110 may be physically mounted on or supported by the bracket member 296, as best shown in FIG. 3.

In order to maintain the switching means 220 in the neutral position with the movable bridging contact member 213 electrically connecting the stationary contact members or terminals 216 and 218, as shown in FIG. 3, and in order to permit the energization of the signalling means 110 by the thermally responsive means 50, the connecting rod 238 is provided with a flange member 244 which is mounted thereon or formed integrally therewith. The opposing compression or bias springs 236 are then provided on the opposite sides of the flange member 244 and restrained by the projecting members or abutments 297 of the bracket member 296. The projecting members or lugs 297 of the bracket member 296 are formed with the recesses or apertures through which pass the connecting rod 238 to permit vertical movement of said connecting rod while restraining the compression springs 236. The compression springs 236 bear against or apply pressure to the opposite sides of the flange member 244 to maintain the connecting rod 238, as well as the switching means 220, in the neutral position shown in FIG. 3.

As previously mentioned, the switching means 220 of the manually operable means 210 is connected in circuit relation with both the circut breaker 100 and the signalling means 110. In particular, the stationary contact member 214 of the switching means 220 is connected to one side of the normally closed contact 156 of the tripping solenoid 150 which is connected in series circuit relation with the operating coil 142 of the reclosing solenoid 140. The stationary contact member 216 of the switching means 220 is connected to one side of the holding contact 76 of the holding relay 70 in the signalling means 110, said holding contact being connected in series circuit relation with both the indicating lamp 78 and the operating coil 74 of the holding relay 70. The stationary contact member 218 of the switching means 220, which may be considered as a common terminal of the switching means 220 since it is engaged by the movable bridging contact member 213 in all positions of said switching means, is connected to the upper end of the loosely coupled coil portion 45A. The stationary contact member 222 of the switching means 220 is connected to the upper end of the operating coil 152 of the tripping solenoid 150.

The operation of the manually operable means 210 in actuating the operation of the circuit breaker 100 independently of the operation of the thermally responsive means 50 and in resetting the signalling means 110 after said signalling means has been activated by the operation of said thermally responsive means will now be described. In the neutral position in which the manually operable means 210 and more particularly, the switching means 220 is maintained, with the movable bridging contact member 213 electrically connecting the stationary contact members 216 and 218 as shown in FIG. 2, the signalling means 110 may be energized by the thermally responsive means 50 and more particularly by the bimetallic member 64 as previously described.

If the signalling means 110 has been energized by the operation of the bimetallic member 64 of the thermally responsive means 50, as previously described, and said energization is being maintained by the holding relay 70 of said signalling means, the manually operable means 210 may be manually operated to reset said signalling means assuming that the thermal condition of the transformer 10 has changed and the free end of the bimetallic member 64 of the thermally responsive means 50 no longer forms a closed circuit with the stationary contact member 63 of said thermally responsive means and that the circuit breaker is in a circuit closing position with the contact member 134 in the open position. To reset the signalling means 110, the operating handle 232 is rotated or actuated in the counterclockwise direction by suitable means, such as a hook stick, with the projection 257 on the guard member 256 moving in the direction of the arrow above the word "LIGHT" on the position indicating member or dial member 252 of said manually operable means. The latter motion is transmitted from the operating handle through the sleeve or operating shaft 274, the crank arm 224 and the connecting rod 238 to the switch arm 212 of the switching means 220. When the projection 257 on the guard member 256 moves sufficiently in the direction of the arrow above the word "LIGHT" on the position indicating member 252, the movable bridging contact member 213 of the switching means 220 no longer engages the stationary contact member 216, thus disconnecting the upper end of the loosely coupled coil 45 from the holding contact 76 of the holding relay 70 and deenergizing said holding relay, as well as the indicating lamp 78. It is to be noted that the direction of the rotation of the switch arm 212 is in a clockwise direction or opposite to the counterclockwise direction of rotation of the operating handle 232 in the diagrammatic view shown in FIG. 2.

In order for the manually operable means 210 to actuate the circuit breaker 100 to a circuit interrupting position, the operating handle 232 of said manually operable means is actuated or rotated in a clockwise direction, as shown in FIG. 4, with the projection 257 on the guard member 256 moving in the direction of the arrow above the word "OPEN" marked on the dial member 252. When the projection 257 on the guard member 256 moves in the direction of the arrow above the word "OPEN" and substantially lines up with the word "OPEN," contact member 213 of the switching means 220 is rotated in a counterclockwise direction until the stationary contact member 218 is electrically connected to the stationary contact member 222, thus connecting the upper end of the operating coil 152 of the tripping solenoid 150 to the upper end of the loosely coupled coil 45 and energizing said operating coil, since the lower end of said operating coil is already connected to the lower end of the loosely coupled coil 45 at the terminal 75, as well as actuating the circuit breaker 100 to a circuit interrupting position as previously described for the energized condition of said operating coil. It is to be noted that the latter actuation of the circuit breaker 100 to a circuit interrupting position by the manually operable means 210 may be accomplished independently of the operation of the thermally responsive means 50.

In order for the manually operable means 210 to actuate the circuit breaker 100 to a circuit closing position, the operating handle 232 of said manually operable means is actuated or rotated in a counterclockwise direction with the projection 257 on the guard member 256 moving in the direction of the arrow above the word "CLOSE" on the position indicating member 252, as shown in FIG. 4. When the projection 257 on the guard member 256 substantially lines up with the word "CLOSE" on the dial member 252 the switch arm 212 of the switching means 220 is rotated in a clockwise direction, as shown in FIG. 2, until the bridging member 213 electrically connects the stationary contact member 214 and the stationary contact member 218, thus connecting the upper end of the loosely coupled coil to the right end of the operating coil 142 of the reclosing solenoid 140 through the normally closed contact 156 of the tripping solenoid 150 and energizing said reclosing solenoid since the other end of said operating coil is connected to the lower end of the loosely coupled coil 45 at the terminal 75 energizing the operating coil 142 of the reclosing solenoid 140 operates to actuate the circuit breaker 100 to a circuit closing position, as previously described. If the tripping solenoid 150 is being energized by the operation of the thermally responsive means 50, the manually operable means 210 cannot actuate the circuit breaker 100 to a circuit closing position since the normally closed contact 156 of the trip solenoid 150 will be open, thus providing trip free operation of the circuit breaker 100. As previously mentioned, the reclosing operation of the circuit breaker 100 by the operation of the manually operable means 210 is verified by the operation of the contact member 134 of the circuit breaker 100 which will remain closed, unless the associated contact members 122 and 128 of said circuit breaker are in the circuit closing position, and energize the indicating lamp 78 of the signalling means 110 until the circuit breaker 100 is actuated to a circuit closing poistion by the operation of the manually operable means 210. It is to be noted that the manually operable means 210, including the switching means 220, is always returned to the neutral position shown in FIGS. 2 and 3 by the operation of the compression springs 236 and the flange member 244 unless the operating handle 232 of said manually operable means is being actuated either in a clockwise or counterclockwise direction by a suitable means, such as a hook stick. It is also to be noted that the stationary contact members 214, 216, 218 and 222 may be protected by a suitable guard member or cover 295 in certain applications, as shown in FIG. 3.

Figure 6:
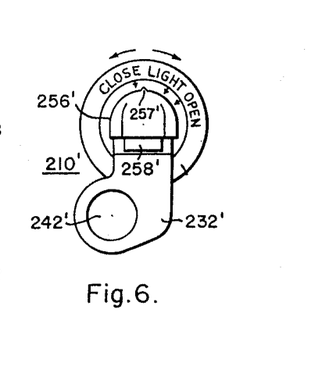
FIG. 6 is a side elevational view of the exterior portion of an alternate embodiment of the manually operable means shown in FIGS. 3 through 5.

Referring to FIG. 6, there is illustrated an alternate manually operable means 210' including an alternate dial or position indicating member 256' and with the stationary contact member 216' mounted between the stationary contact members 214 and 218, as shown in phantom in FIG. 3. The manually operable means 210' is otherwise the same as the manually operable means 210 and the electrical connections are the same as for the manually operable means 210.

In general, the operation of the manually operable means 210' is similar to that of the manually operable means 210 except that to reset the signalling means 110 the operating handle 232' is rotated in a clockwise direction and the switch arm 212 in a counterclockwise direction toward the terminal or contact member 222 thus interrupting the connection between the common terminal 218 and the terminal 216' in the new position. The former arrangement of the manually operable means 210 previously described in detail, has the advantages that overtravel of the operating handle 232, shown in FIG. 4, and the switch arm 212 cannot inadvertently energize the tripping solenoid 150 and also that it is not necessary to reset the signalling circuit 110 after the manual operable means 210 has actuated the circuit breaker 100 to a circuit closing position.

In particular, if the signalling means 110 has been energized by the operation of the bimetallic member 64 of the thermally responsive means 50, as previously described, and said energization is being maintained by the holding relay 70 of said signalling means, the manually operable means 210' may be manually operated to reset said signalling means assuming that the thermal condition of the transformer 10 has changed and the free end of the bimetallic member 64 of the thermally responsive means 50 no longer forms a closed circuit with the stationary contact member 63 of said thermally responsive means and the circuit breaker 100 is in a circuit closing position with the contact member 134 in the open position. To reset the signalling means 110, the operating handle 232' is rotated or actuated in the clockwise direction by suitable means, such a hook stick until the projection 257' on the guard member 256' substantially lines up with the arrow marked "LIGHT" on the position indicating member or dial member 252' of said manually operable means. The latter motion is transmitted from the operating handle through the sleeve or operating shaft 274, the crank arm 224 and the connecting rod 238 to the switch arm 212 of the switching means 220. When the projection 257' on the guard member 256' substantially lines up with the arrow marked "LIGHT" on the position indicating member 252', the movable bridging contact member 213 of the switching means 220 no longer engages the stationary contact member 216' and does not yet engage the stationary contact member 222, thus disconnecting the upper end of the loosely coupled coil 45 from the holding contact 76 of the holding relay 70 and deenergizing said holding relay, as well as the indicating lamp 78. It is to be noted that the direction of the rotation of the switch arm 212 is also in a counterclockwise direction or opposite to the clockwise direction of rotation of the operating handle 232' in the diagrammatic view shown in FIG. 2.

In order for the manually operable means 210' to actuate the circuit breaker 100 to a circuit interrupting position, the operating handle 232' of said manually operable means is actuated or rotated further in a clockwise direction as shown in FIG. 6 until the projection 257' on the guard member 256' substantially lines up with the arrow marked "OPEN." When the projection 257' on the guard member 256' substantially lines up with the arrow "OPEN," the bridging contact member 213 of the switching means 220 is rotated in a counterclockwise direction until the stationary contact member 218 is electrically connected to the stationary contact member 222, thus connecting the upper end of the operating coil 152 of the tripping solenoid 150 to the upper end of the loosely coupled coil 45 and energizing said operating coil since the lower end of said operating coil is already connected to the lower end of the loosely coupled coil 45 at the terminal 75, as well as actuating the circuit breaker 100 to a circuit interrupting position as previously described for the energized condition of said operating coil. It is to be noted that the latter actuation of the circuit breaker 100 to a circuit interrupting position by the manually operable means 210' may also be accomplished independently of the operation of the thermally responsive means 50.

In order for the manually operable means 210' to actuate the circuit breaker 100 to a circuit closing position, the operating handle 232' of said manually operable means is actuated or rotated in a counterclockwise direction until the projection 257' on the guard member 256' substantially lines up with the arrow marked "CLOSE" on the position indicating member 252 as shown in FIG. 6. When the projection 257' on the guard member 256' substantially lines up with the arrow marked "CLOSE," the switch arm 212 of the switching means 220 is rotated in a clockwise direction, as shown in FIG. 2, until the bridging member 213 electrically connects the stationary contact member 214 and the stationary contact member 218, thus connecting the upper end of the loosely coupled coil to the right end of the operating coil 142 of the reclosing solenoid 140 through the normally closed contact 156 of the tripping solenoid 150 and energizing said reclosing solenoid since the other end of said operating coil is connected to the lower end of the loosely coupled coil 45 at the terminal 75. Energization of the operating coil 142 of the reclosing solenoid 140 operates to actuate the circuit breaker 100 to a circuit closing position as previously described. If the tripping solenoid 150 is being energized by the operation of the thermally responsive means 50, the manually operable means 210' cannot actuate the circuit breaker 100 to a circuit closing position since the normally closed contact 156 of the trip solenoid 150 will be open, thus providing trip free operation of the circuit breaker 100. As previously mentioned, the reclosing operation of the circuit breaker 100 by the operation of the manually operable means 210' is verified by the operation of the contact member 134 of the circuit breaker 100 which will remain closed unless the associated contact members 122 and 128 of said circuit breaker are in the circuit closing position and energize the indicating lamp 78 of the signalling means 110 until the circuit breaker 100 is actuated to a circuit closing position by the operation of the manually operable means 210'. It is to be noted that the manually operable means 210', including the switching means 220', is always returned to the neutral position shown in FIGS. 2 and 3 by the operation of the compression springs 236 and the flange member 244 unless the operating handle 232' of said manually operable means is being actuated either in a clockwise or counterclockwise direction by a suitable means, such as a hook stick. It is also to be noted that the stationary contact members 214, 216', 218 and 222 may be protected by a suitable guard member or cover 295 in certain applications, as shown in FIG. 3.

It is to be understood that in certain applications, the base or quadrant portion 248 and the sleeve or internally hollow operating shaft 274 of the manually operable means 210 may be provided with corresponding mechanical limits or stops as described in greater detail for the switch operator disclosed in U.S. Patent 2,356,055 previously mentioned in order to limit the rotational travel of the operating handle 232, the crank arm 224 and the switch arm 212 of said manually operable means. It is also to be understood that in a protective system as disclosed, the circuit breaker 100 may be provided with automatic reclosing means, as an alternative to the manually operable reclosing means included in the manually operable means 210 or 210' or in combination with said manually operable means in a particular application. It is also obvious that an electrical transformer as disclosed may be provided in a polyphase or three-phase embodiment rather than being a single-phase unit as illustrated in FIGS. 1 through 5. Since the circuit interrupter or circuit breaker included with an electrical transformer as disclosed may include both electrically operated tripping means and electrically operated reclosing means, the manually operable means 210 or 210' may be provided at a remote location rather than being mounted directly on the casing 46 and internally of said casing as disclosed.

The apparatus embodying the teachings of this invention has several advantages. For example, electrical energy required for the operation of the signalling means or circuit and the circuit breaker which may include both electrically operated tripping and reclosing means in a transformer as disclosed is assured, so long as one of the main windings of said transformer is connected to a source of electrical current without subjecting said signalling means or said electrically operated tripping or reclosing means to dangerous over-voltages when a surge voltage is present on one of said main windings. In addition, a transformer as disclosed is protected automatically from dangerous overload conditions, as previously described, in response to a thermally responsive means while certain mechanical problems are substantially eliminated in interrupting load currents of a transformer as disclosed particularly for higher ratings of said transformer.

Since numerous changes may be made in the above described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. A protected transformer comprising an insulated high voltage winding, an insulated low voltage winding, a casing, a fluid dielectric in said casing, said windings being disposed in said dielectric, leads connected to said low voltage winding and passing out of said casing, a reclosable circuit interrupter disposed within said casing and having contacts in series circuit relation with at least one of said leads, said interrupter including electrically operated tripping means for opening said contacts when energized, a coil loosely coupled in inductive relation with said high voltage winding for supplying electric current, first individually adjustable thermally responsive means for connecting said coil to said tripping means to open said contacts in response to a predetermined temperature condition of said fluid dielectric, a signalling means, and second individually adjustable thermally responsive means operable independently of the first thermally responsive means for connecting said signalling means to said coil to energize said signalling means in responsise to a lower temperature condition of said fluid dielectric.

2. A protected transformer comprising an insulated high casing, a fluid dielectric in said casing, said windings being disposed in said dielectric leads connected to said low being disposed in said dielectric leads connected to said voltage winding and passing out of said casing, a reclosable circuit interrupter disposed within said casing and having contacts in series circuit relation with at least one of said leads, said interrupter including electrically operated tripping means for opening said contacts when energized, electrically operated means for reclosing the contacts of said interrupter, a coil loosely coupled in inductive relation with said high voltage winding for supplying electric current, first individually adjustable thermally responsive means for connecting said coil to said tripping means to open said contacts in response to a predetermined temperature condition of said dielectric, a signalling means, second individually adjustable thermally responsive means, operable independently of said first thermally responsive means for connecting said signalling means to said coil to energize said signalling means in response to a different temperature condition of said dielectric, and means for connecting said reclosing means to said coil to energize said reclosing means and close the contacts of said interrupter only when said tripping means is deenergized.

3. A transformer comprising an insulated high voltage winding, an insulated low voltage winding, a casing, a fluid dielectric in said casing, said windings being disposed in said dielectric, leads connected to said low voltage winding and passing out of said casing, a reclosable circuit interrupter disposed within said casing and having contacts in series circuit relation with at least one of said leads, said interrupter including electrically operated tripping means for opening said contacts when energized, a coil loosely coupled in inductive relation with said high voltage winding for supplying electric current, first individually adjustable thermally responsive means for connecting said coil to said tripping means to open said contacts in response to a predetermined temperature condition of said fluid dielectric, a signalling means, second individually adjustable thermally responsive means operable independently of the first thermally responsive means for connecting said signalling means to said coil to energize said signalling means in response to a lower temperature condition of said fluid dielectric, and switching means actuated by said interrupter for connecting said coil to said signalling means when said contacts of said interrupter are in the open position.

4. A protected transformer comprising an insulated high voltage winding, insulated low voltage windings, a casing, a fluid dielectric in contact with said windings in said casing, leads connected to said low voltage windings and passing out of said casing, a reclosable circuit interrupter disposed within said casing and having contacts in series circuit relation with at least one of said leads, said interrupter including electrically operated tripping means for opening said contacts when energized, a coil loosely coupled in inductive relation with said high voltage winding for supplying electric current, first thermally responsive means for connecting said coil to said tripping means to open said contacts in response to a predetermined temperature condition of said dielectric, a signalling means, second thermally responsive means for connecting said signalling means to said coil to energize said signalling means in response to a lower temperature condition of said dielectric, relay means for maintaining said signalling means in the energized condition after said second thermally responsive means connects said coil to said signalling means independently of the condition of said second thermally responsive means, and manually operable means for resetting said relay means without affecting the operation of the circuit interrupter.

5. A transformer comprising an insulated high voltage winding, an insulated low voltage winding, a casing, a fluid dielectric in contact with said windings in said casing, leads connected to said low voltage winding and passing out of said casing, a reclosable circuit interrupter disposed within said casing and having contacts in series circuit relation with at least one of said leads, said interrupter including electrically operated tripping means for opening said contacts when energized, a coil loosely coupled in inductive relation with said high voltage winding for supplying electric current, first thermally responsive means for connecting said coil to said tripping means to open said contacts in response to a predetermined temperature condition of said fluid dielectric, a signalling means, second thermally responsive means for connecting said signalling means to said coil to energize said signalling means in response to a lower temperature condition of said fluid dielectric, and means for resetting said signalling means to the deenergized condition without opening said contacts when said second thermally responsive means is not connecting said coil to said signalling means.

6. A transformer comprising windings subject to varying load, electrically energized signalling means for indicating a predetermined load on said transformer, a circuit breaker including electrically operated tripping and reclosing means connected in circuit relation with said windings to disconnect the windings from said load, a casing for said transformer, a coil loosely coupled electromagnetically with said windings for supplying electric current, load responsive means for selectively connecting said coil to said signalling and said tripping means to energize said means, relay means for maintaining said signalling means energized independently of said load responsive means, manually operable means for actuating said breaker to an open position and to a closed position and for resetting said relay means without affecting the operation of the circuit breaker, said manually operable means comprising a stationary base portion mounted on said casing, a handle portion concentrically arranged on said base portion, switching means mechanically coupled to said handle portion for changing the connections between said coil and said tripping, reclosing and signalling means at different positions of said handle portion to change the energization of said latter means, and biasing means for maintaining said switching means in a neutral position, said switching means being connected in circuit relation with said coil when the switching means is in the neutral position to permit the energization of said tripping and signalling means by said load responsive means.

7. A transformer comprising a core, a primary winding on said core, a secondary winding on said core and comprising two coils each having a pair of leads extending therefrom, three secondary terminals, one lead from each of the two coils being each connected to a common one of said terminals, said leads having current flowing therethrough instantaneously in opposite directions, the other lead from each of the two coils being each connected to an individual one of said terminals, a mutipole circuit breaker having contacts for opening the circuits through the two leads connected to the individual terminals, a pick-up coil inductively responsive to the sum of the currents flowing in both of the two leads connected to the common terminal, control means connected to be affected by the current in said pick-up coil and connected to cause tripping operation of said circuit breaker.

8. A transformer comprising a core, a primary winding on said core, a secondary winding on said core and comprising two coils each having a pair of leads extending therefrom, at least two of said leads each from a different one of said coils being substantially rigid conductors in which current flows instantaneously in opposite directions, a pick-up coil mounted on both of said substantially rigid conductors and mutually coupled therewith to produce an output current varying with the sum of the currents flowing in said two conductors, a circuit breaker having contacts serially connected in each of the other two leads from the two secondary coils, and control means responsive to the current in said pick-up coil and electrically connected to cause opening of the contacts of said circuit breaker in the other two leads from the two secondary coils.

9. A transformer comprising a casing, windings disposed in said casing, leads extending out from one of said windings through said casing, said leads comprising at least two conductors in which current flows instantaneously in opposite directions, a current pick-up coil disposed adjacent to and non-ferromagnetically coupled to said two conductors for obtaining an output current which varies in a substantially linear manner with the sum of the currents in said two conductors, the plane of said coil being substantially parallel to the plane of said conductors, thermally responsive devices connected in series circuit realtion with said coil to be heated by the output current thereof, and control means controlled by the operation of said thermally responsive devices.

References Cited by the Examiner
UNITED STATES PATENTS

| | | | |
|---|---|---|---|
| 2,298,229 | 10/42 | Putman | 317—14 |
| 2,333,537 | 11/43 | Leonard | 317—14 |
| 2,356,055 | 8/44 | Hodnette | 317—14 |
| 2,597,185 | 5/52 | Roeding | 317—14 |
| 2,650,356 | 8/53 | Stein | 317—15 |
| 3,126,500 | 3/64 | Astleford et al. | 317—14 |

MAX L. LEVY, *Primary Examiner.*